Oct. 28, 1947.  J. A. PHILLIPS  2,429,841
SEED PLANTING MACHINE
Filed Dec. 6, 1944  2 Sheets-Sheet 1

Inventor
James A. Phillips,

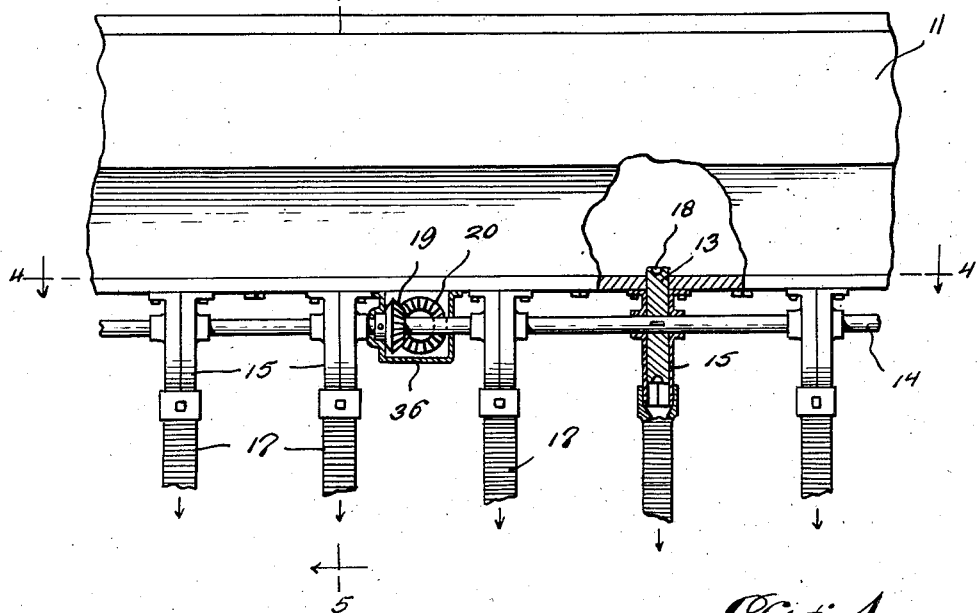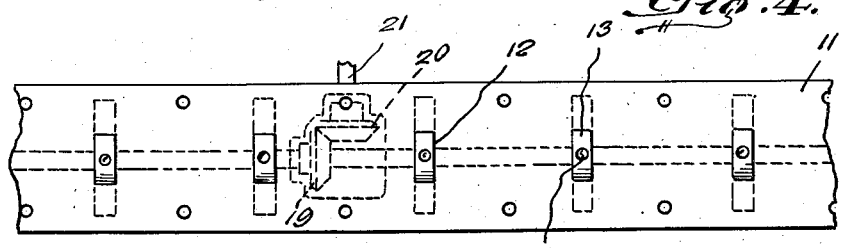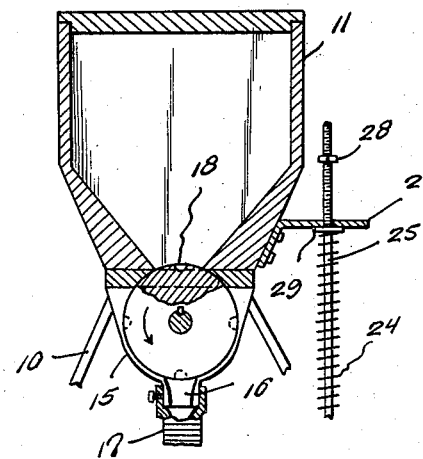

Patented Oct. 28, 1947

2,429,841

UNITED STATES PATENT OFFICE 2,429,841

SEED PLANTING MACHINE

James A. Phillips, Sayre, Okla.

Application December 6, 1944, Serial No. 566,786

2 Claims. (Cl. 111—59)

This invention relates to improvements in seed planting machines, and more particularly to a device for planting measured quantities of seed in a furrow in an efficient and labor-saving manner.

A main object of this invention is to provide a planting machine adapted to be used in conjunction with a farm tractor for planting corn, wheat, barley and the like, in accurately measured quantities.

A further object of this invention is to provide a planting machine which will maintain its accuracy of distribution of seed in spite of irregularities of the ground over which the machine travels, and wherein effective control means is provided for varying the rate of distribution of seed as desired.

Further objects of this invention will appear from the following description and claims, and from the accompanying drawings, wherein:

Figure 3 is a detail view, partly in section showing the structure of the seed-distributing mechanism of the machine of this invention.

Figure 4 is a view taken on line 4—4 of Figure 3.

Figure 5 is a cross-sectional view taken on line 5—5 of Figure 3.

Figure 1:
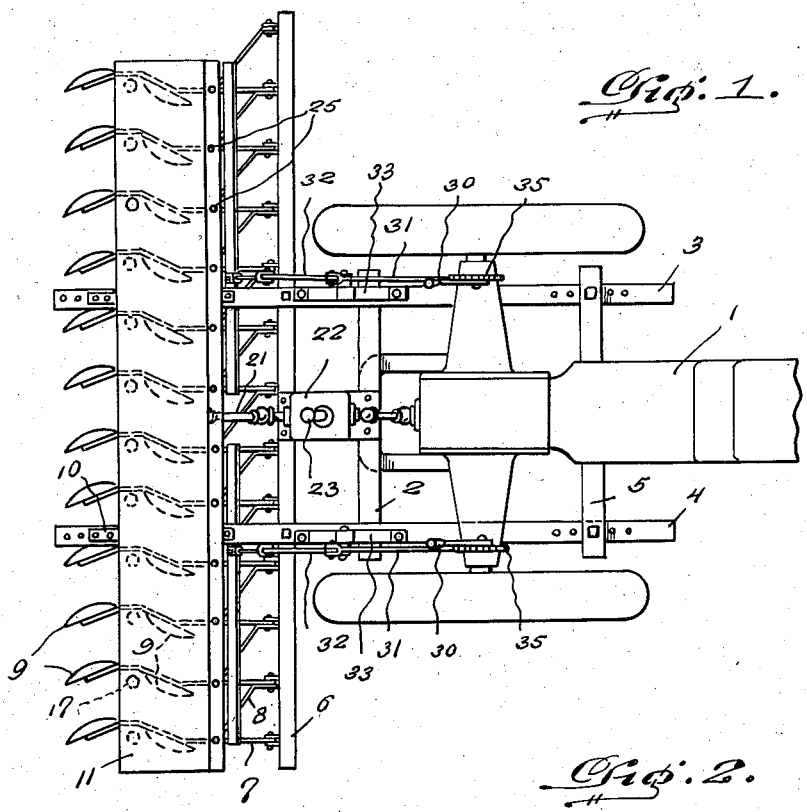
Figure 1 is a plan view of a planting machine in accordance with this invention.

Referring to the drawings, 1 designates a farm tractor provided with a transverse supporting bar 2, rigidly secured to the body thereof. Supported and secured to bar 2, and extending longitudinally to the rear of tractor 1 are drawbars 3, 4, which may be steel channels. Securement of bars 3, 4 to bar 2 is by headed members which may be bolts, rivets or the like. The forward ends of bars 3, 4 are secured together by a transverse bar 5.

At the rearward portions of bars 3, 4 a transverse disc-supporting channel member 6 is provided, secured to bars 3, 4 and having pivotally secured thereto a plurality of disc brackets 7 forming a single rigid frame structure, the brackets 7 being secured together by diagonal struts 8. Each bracket 7 carries a pair of furrowing discs 9 arranged on said bracket to form a seed-receiving furrow as the tractor moves forward dragging the discs along the ground.

Mounted adjacent the rear ends of bars 3, 4 are a pair of seed box-supporting brackets 10, which support a seed box 11, appropriately secured to said brackets 10, and substantially in vertical alignment with the row of furrowing discs 9.

Seed box 11 is trough-shaped and extends transversely of bars 3, 4. It is substantially the same length as transverse channel member 6 and is provided with a series of rectangular slots 12 in the bottom wall thereof spaced substantially in vertical alignment with the respective pairs of furrowing discs 9.

Figure 2:
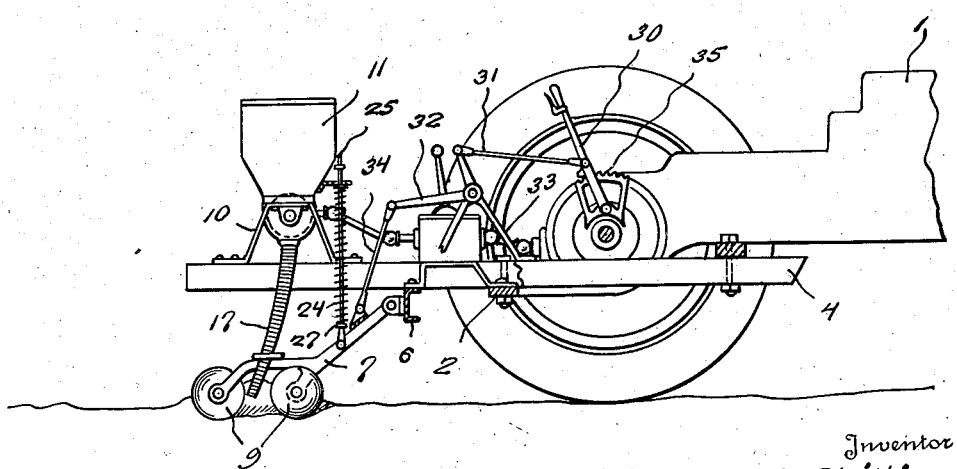
Figure 2 is a side elevational view of the planting machine of Figure 1.

Each slot 12 receives the top portion of a seed disc 13 carried on a transverse shaft 14. Each seed disc 13 is housed in a casing 15 supported from the bottom wall of seed box 11 and providing bearings for shaft 14. Each casing 15 is provided with a bottom spout 16 to which is attached a hose section 17 extending to a point adjacent the ground between a pair of furrowing discs 9 and secured to the disc bracket 7 associated with said pair, as shown in Figure 2.

Each seed disc 13 is provided with a plurality of uniformly spaced peripheral recesses 18 adapted to receive a seed from seed box 11 and carry it to spout 16 as shaft 14 is rotated. The seed then drops through hose section 17 and is deposited in the furrow between the associated pair of discs 9. In this manner the seeds can be distributed uniformly along the furrow as the tractor moves forward, provided the shaft 14 rotates at a definite speed with respect to the speed of movement of the tractor.

Shaft 14 carries a bevel gear 19 rigidly secured thereon which meshes with a bevel gear 20 rigidly secured to a power shaft 21. Power shaft 21 is connected by universal couplings to a transmission box 22 which in turn is connected by universal couplings to a power take-off from the main drive of the tractor. The ratio of adjustment of the speed of rotation of shaft 14 with respect to the speed of movement of the tractor can thus be operatively established by actuation of the gear-changing handle 23 of transmission box 22. This ratio will depend on the type of seed being planted and other determining factors which would decide what seed spacing is desired.

Bevel gears 19 and 20 are housed in a casing 36 secured to the bottom wall of seed box 11. Suitable bearings for shafts 14 and 21 are provided in the walls of said casing.

In order to maintain a constant planting depth where the ground is uneven and to make possible a substantially more rapid rate of planting than has been heretofore possible, a pressure spring 24 is provided between the seed box 11 and the pivoted disc bracket frame structure. Pressure spring 24 is supported on a rod 25 pivotally secured at its bottom end on one of the disc brackets 7 and at its top end slidably engaging an opening in a bracket member 26 secured to the seed box 11. A collar 27 is rigidly secured to rod 25 adjacent its bottom end to form a bottom bearing for spring 24 and a nut 28 is threaded onto the top end of rod 25 to form an adjustable end stop means to limit downward movement of the disc bracket frame structure with respect to seed box 11. A washer 29 is provided on rod 25 under bracket 26 to form a top bearing for spring 24.

Pressure spring 24 provides a normal downward pressure on the disc bracket frame structure which tends to maintain a constant depth of penetration of the discs 9 in the furrows and hence tends to maintain a constant planting depth. However, the disc bracket frame is permitted to rapidly follow irregularities in the ground without bouncing or excessive jarring, and the furrow depth is maintained substantially constant. By virtue of the normal downward bias provided by spring 24 the tractor may move at a relatively rapid rate without impairing the effectiveness of the furrowing discs.

To move the furrowing disc bracket frame into an inoperative position at the completion of the planting operation, dual lifting mechanisms are provided, each comprising hand lever 30 and a linkage made up of link 31, bent lever 32 pivotally mounted on a bracket 33 secured to a drawbar member 3 or 4, and a link 34 joining bent lever 32 to the disc bracket frame structure. A conventional rack segment 35 cooperates with a locking dog on lever 30 to releasably lock the mechanism in desired position. To raise the furrowing disc frame structure into inoperative position, the operator grasps one lever 30 in each hand and pulls on said levers. By then releasing the levers, the furrowing disc frame structure will be held in raised position. To bring them back to operating position, the same procedure is followed except that the operator allows the frame structure to drop instead of pulling.

While a specific seed planting machine has been disclosed in the foregoing description, it will be understood that various modifications within the spirit of the invention will occur to those skilled in the art. Therefore, it is intended that no limitations be placed on the invention other than as defined by the scope of the appended claims.

What is claimed is:

1. A seed planting machine comprising a tractor, a power unit for said tractor, a supporting frame carried by said tractor and extending rearwardly thereof, a transversely extending seed box mounted on said supporting frame, a plurality of transversely spaced longitudinal slots provided in the bottom wall of said seed box, a plurality of cylindrical members, each cylindrical member having its top segmental portion received in one of said longitudinal slots, a housing for each cylindrical member secured to the bottom wall of said seed box and having a bottom spout portion, a transversely extending rod journaled in the side walls of each housing and rigidly secured to each cylindrical member at the center thereof for rotating said cylindrical member within its housing, each cylindrical member being provided with a plurality of seed-receiving recesses uniformly spaced on the peripheral surface thereof, drive means for rotating said rod, said drive means comprising a speed changing unit, and a transmission shaft operatively connected to said power unit and adapted to provide a desired ratio between the speed of rotation of the rod and the speed of travel of the tractor, furrowing means pivotally connected to said supporting frame and extending rearwardly thereof, said furrowing means comprising a frame structure provided with a plurality of bracket elements, each bracket element being substantially in vertical alignment with a cylindrical member and being provided with a forward and a rearward furrowing disc, hose means extending from each spout portion and secured to the bracket element below it with the outlet end thereof positioned between the forward and rearward discs, and pressure spring means mounted between said seed box and said frame structure acting to bias the furrowing discs to a ground-engaging position.

2. The structure of claim 1, and wherein a lifting mechanism is provided on said tractor and connected to said frame structure for at times lifting the furrowing discs out of ground-engaging position against the force of said pressure spring means.

JAMES A. PHILLIPS.

REFERENCES CITED

The following references are of record in the file of this patent:

UNITED STATES PATENTS

| Number | Name | Date |
| --- | --- | --- |
| 273,647 | Ward | Mar. 6, 1883 |
| 713,976 | Funk | Nov. 18, 1902 |
| 1,061,596 | Burns | May 13, 1913 |
| 1,264,153 | Burgess | Apr. 30, 1918 |
| 2,200,165 | Fulkerson | May 7, 1940 |
| 2,334,376 | Bauer | Nov. 16, 1943 |